United States Patent
McGarvey et al.

(10) Patent No.: US 10,261,925 B2
(45) Date of Patent: Apr. 16, 2019

(54) ENHANCED TECHNIQUES FOR DETECTING PROGRAMMING ERRORS IN DEVICE DRIVERS

(71) Applicant: MICROSOFT TECHNOLOGY LICENSING, LLC, Redmond, WA (US)

(72) Inventors: Conal McGarvey, Seattle, WA (US); Andrew D. Mikesell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/632,182

(22) Filed: Jun. 23, 2017

(65) Prior Publication Data

US 2018/0373654 A1  Dec. 27, 2018

(51) Int. Cl.
*G06F 13/24* (2006.01)
*G06F 11/07* (2006.01)
*G06F 13/26* (2006.01)
*G06F 17/30* (2006.01)

(52) U.S. Cl.
CPC .......... *G06F 13/24* (2013.01); *G06F 11/0745* (2013.01); *G06F 11/0772* (2013.01); *G06F 13/26* (2013.01); *G06F 11/079* (2013.01); *G06F 11/0778* (2013.01); *G06F 17/30294* (2013.01)

(58) Field of Classification Search
USPC ...................................... 710/260–269, 46–50
See application file for complete search history.

(56) References Cited

U.S. PATENT DOCUMENTS

| 7,111,307 | B1 | 9/2006 | Wang |
| 7,779,425 | B2 | 8/2010 | Pudipeddi et al. |
| 7,844,606 | B2 | 11/2010 | Pudipeddi et al. |
| 8,230,155 | B2 | 7/2012 | Oshins |
| 9,235,497 | B2 | 1/2016 | Ma |

(Continued)

OTHER PUBLICATIONS

Bazan, Nathan, "Overview of the Driver Coverage Toolkit", https://docs.microsoft.com/en-us/windows-hardware/drivers/devtest/overview-of-the-driver-covage-toolkit, Published on: Apr. 20, 2017, 6 pages.*

(Continued)

*Primary Examiner* — Raymond N Phan
(74) *Attorney, Agent, or Firm* — Newport IP, LLC; Tim R. Wyckoff; Scott Y. Shigeta

(57) ABSTRACT

Enhanced techniques for detecting programming errors in device drivers are provided. The techniques disclosed herein enable a system to measure a number of aspects of IRPs including, but not limited to, data identifying processed IRPs, data indicating concurrent IRPs, data identifying a stack location associated with a status of an IRP, and individual status values, which may indicate whether IRPs have failed, succeeded or pended. The disclosed techniques enable a system to determine when and where IRPs were sent or not sent to a stack of device objects and/or to individual device objects. The disclosed techniques enable the system to measure the processing of concurrent IRPs. By the use of filters that are positioned in predetermined locations within a stack, disclosed techniques can test and monitor drivers without imposing unduly burdensome loads on the system.

20 Claims, 7 Drawing Sheets

(56) References Cited

U.S. PATENT DOCUMENTS

2003/0200368 A1* 10/2003 Musumeci ............ G06F 13/128
　　　　　　　　　　　　　　　　　　　　　　710/260
2004/0221205 A1* 11/2004 Kozlov ............... G06F 11/0709
　　　　　　　　　　　　　　　　　　　　　　714/47.1

OTHER PUBLICATIONS

Bazan, Nathan, "PnP Tests (Device Fundamentals)", https://docs.microsoft.com/en-us/windows-hardware/drivers/devtest/pnp-tests-device-fundamentals-, Published on: Apr. 20, 2017, 12 pages.
Bazan, Nathan, "How to Collect IRP Coverage Data", https://docs.microsoft.com/en-us/windows-hardware/drivers/devtest/how-to-collect-irp-coverage-data, Published on: Apr. 20, 2017, 2 pages.
Bazan, Nathan, "Driver Coverage Filter Driver", https://docs.microsoft.com/en-us/windows-hardware/drivers/devtest/driver-coverage-filter-driver, Published on: Apr. 20, 2017, 2 pages.
Bazan, Nathan, "Device Fundamentals Tests", https://docs.microsoft.com/en-us/windows-hardware/drivers/devtest/device-fundamentals-tests, Published on: Apr. 20, 2017, 2 pages.

* cited by examiner

[IRP_MN_START_DEVICE (F)1 (SL) 2-5 (S)1 (SL) 2-5 (P)1 (SL) 2-5,
IRP_MJ_IO_READ (F)0 (SL) 4-5 (S)2 (SL) 4-5 (P)2,
IRP_MN_QUERY_STOP(S)1 (SL) 5-5] 2

FIGURE 4B

ENHANCED TECHNIQUES FOR DETECTING PROGRAMMING ERRORS IN DEVICE DRIVERS

BACKGROUND

Device drivers are computer programs that operate within an operating system and are used to operate or control a device attached to a computer. Device drivers communicate with devices that are in communication with the computer. Device drivers can allow a computer program to communicate with devices, including printers, video adapters, keyboards, pointing devices, network adapters, sound cards, storage devices, cameras, and the like.

There are a number of methods for testing device drivers. In some cases, existing test methods involve trial and error techniques that don't often reveal defects, e.g., bugs, of a device driver. For instance, a testing method can involve several steps for testing a device driver operating with particular environment settings, and in such environment settings, no defects may be exposed. Such methods may lead to a premature release of a device driver.

In addition, when driver defects are discovered, existing test methods make it difficult for developers to identify the source of a particular defect. During the testing phase of a driver, for example, a defect may appear but existing methods do not provide contextual information with respect to where an interrupt request packet was in a device stack. In addition to these issues, existing test methods can involve monitoring software that can be unduly burdensome for an operating system. In some cases, when driver testing and monitoring software is too intensive, the testing and monitoring software may be the cause of one or more system failures. Further, existing driver test methods can be difficult to manage, labor-intensive and somewhat unpredictable.

It is with respect to these and other considerations that the disclosure made herein is presented.

SUMMARY

The techniques disclosed herein provide enhanced techniques for detecting programming errors in device drivers. The techniques can measure the processing of Interrupt Request Packets (IRPs) that are processed by a computing device while mitigating the use of computing system resources used for testing and measuring the processing of IRPs. The techniques disclosed herein enable a system to measure a number of aspects of IRPs including, but not limited to, data identifying IRPs sent to or generated by a stack, data indicating concurrent IRPs, data identifying a stack location associated with a status of an IRP, and individual status values, which may indicate whether IRPs have failed, succeeded or pended. In addition, the techniques disclosed herein enable a system to determine where and when IRPs were sent or not sent to a stack of device objects and/or to individual device objects. In some configurations, the techniques disclosed herein enable the system to measure the processing of concurrent IRPs, e.g., IRPs that are in-flight at the same time. In addition, by the use of filters that are positioned in predetermined locations within a stack, the techniques disclosed herein can test and monitor drivers without imposing unduly burdensome loads on the system.

The techniques disclosed herein can also generate reporting data that can be used to change one or more operating environment parameters enabling a system to perform more targeted tests. For instance, reporting data identifying individual IRPs and processing parameters for individual IRPs can enable a testing procedure to be adjusted, e.g., different combinations of IRPs can be run, or aspects of a computing device can be modified before additional iterations of a test are performed. In one illustrative example, a computer may operate with an enabled camera on a first iteration of a test and then operate with a disabled camera on a second iteration. In another example, a computer may operate with sleep mode enabled in a first iteration of a test and then operate with sleep mode disabled in a second iteration of the test. In some configurations, the techniques disclosed herein introduce machine learning algorithms that help automate testing procedures to mitigate or eliminate the need for labor-intensive, manual testing.

In one illustrative example, a system can include a stack having plurality of device objects and a plurality of filters in a serial configuration. The filters are positioned at predetermined locations with respect to the device objects to measure number processing parameters with respect to IRPs that are sent to the stack or generated by device objects within the stack. In some configurations, a first filter is positioned to receive one or more IRPs. The first filter can measure number processing parameters such as a time in and a time out for each IRP. In addition, the first filter can determine when individual IRPs succeeded, failed, or pended. Such data can be used to determine which IRPs are concurrent. For illustrative purposes, two or more IRPs are concurrent when they have some overlap in a timeline from their time in and time out of the stack.

The first filter is configured to communicate individual IRPs to a first device object. The first device object may then communicate individual IRPs to a second device object, and other subsequent device objects. The second device object or other subsequent device objects may then communicate the IRPs to a second filter. The second filter can measure a number of processing parameters such as the processing parameters described above. The second filter can then communicate the IRPs to one or more additional device objects, where the IRPs can then be rerouted back through the stack of device objects and filters. The filters can be coordinated to generate reporting data indicating a status of individual IRPs as well as stack locations associated with each status.

In some configurations, the techniques disclosed herein enable a system to record aspects of an IRP that enters or leaves a device node (devnode) for a device. The techniques involve filters, also referred to herein as filter drivers, to monitor active IRPs within the device stack, regardless of where the IRPs originated. When an IRP originates outside of the device stack, the filter driver can increment its counters for the IRP at the time the IRP entered the stack. When an IRP originates from a driver within the device stack, the filter driver can increment its counters when the IRP leaves the device stack. The systems disclosed herein provide IRP pair coverage data based on IRP concurrency, in which multiple IRPs are active within the devnode (also referred herein as a "stack" or "device stack") at the same time, and allows a system or user to specify the devices that the filter driver monitors by using one or more parameters. For instance, when a user or system runs the Enable IRP Coverage data collection tool, UpperFilter=TRUE, this option installs the Driver Coverage filter driver as an upper filter to the device driver for the specified device. This configuration monitors all IRP traffic into or out of the device driver within the device stack, regardless of whether the driver processed the IRP or passed it through to lower device drivers. When a user or system runs the Enable IRP Coverage data collection tool, UpperFilter=FALSE, this option installs the Driver Coverage filter driver as a lower filter to the device driver for the specified device. This configuration monitors all IRP traffic into or out of the device driver from lower drivers within the device stack. The techniques disclosed herein can utilize any configuration of the stack, which may include only the upper filter(s), any of the lower filter(s), all filters (upper and lower), or no filters (where coverage measurement is disabled).

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4B illustrates another embodiment of reporting data that can be generated by the techniques disclosed herein.

DETAILED DESCRIPTION

Figure 1:
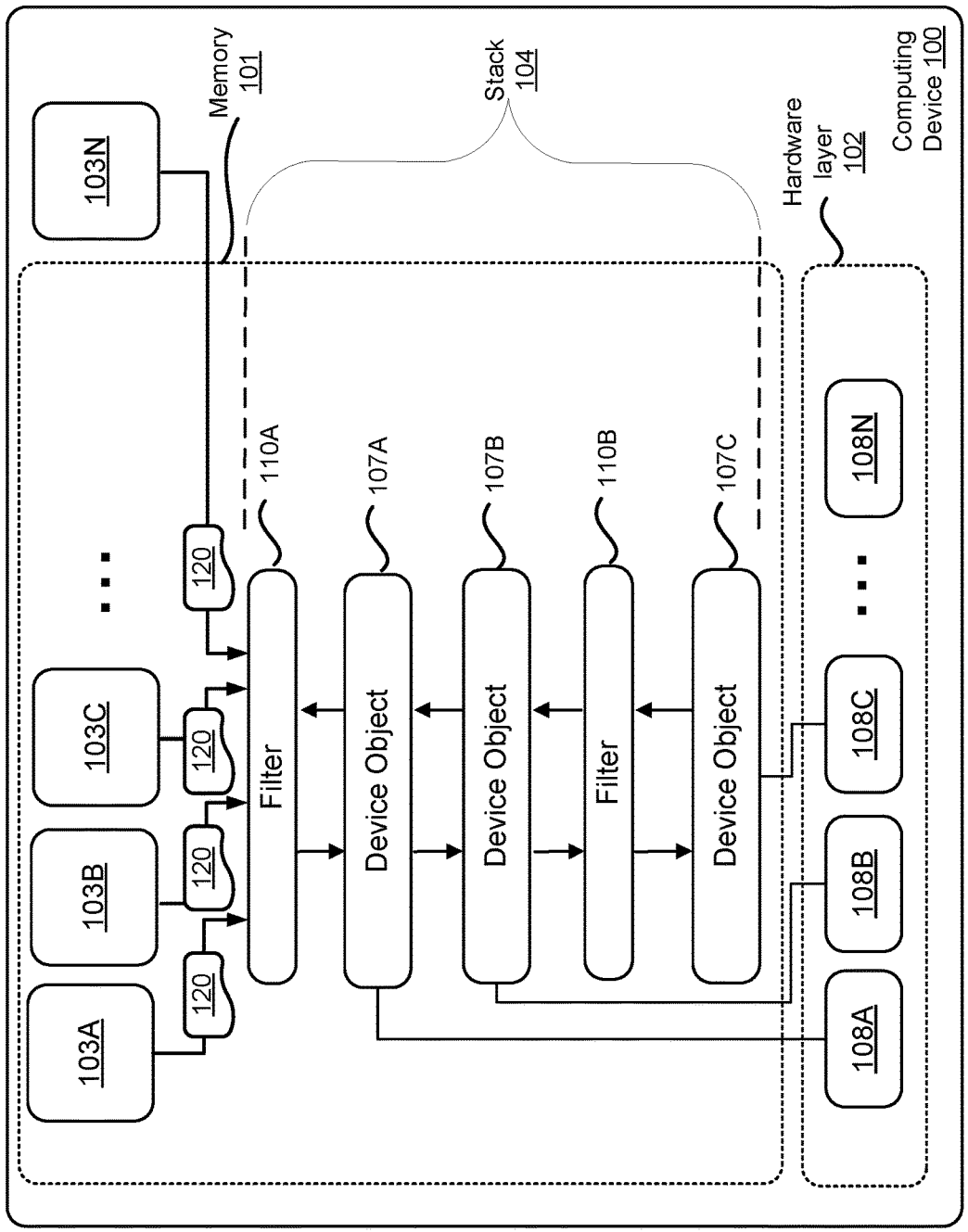
FIG. 1 is an example computing system illustrating aspects of a stack that can be utilized for implementing aspects of the present disclosure.

The techniques disclosed herein provide enhanced techniques for detecting programming errors in device drivers. The techniques can measure the processing of Interrupt Request Packets (IRPs) that are processed by a computing device while mitigating the use of computing system resources used for testing and measuring the processing of IRPs. The techniques disclosed herein enable a system to measure a number of aspects of IRPs including, but not limited to, data identifying IRPs sent to or generated by a stack, data indicating concurrent IRPs, data identifying a stack location associated with a status of an IRP, and individual status values, which may indicate whether IRPs have failed, succeeded or pended. In addition, the techniques disclosed herein enable a system to determine where and when IRPs were sent or not sent to a stack of device objects and/or to individual device objects. In some configurations, the techniques disclosed herein enable the system to measure the processing of concurrent IRPs, e.g., IRPs that are in-flight at the same time. By the use of filters that are positioned in predetermined locations within a stack, the techniques disclosed herein can test and monitor drivers without imposing unduly burdensome loads on the system.

The techniques disclosed herein can also generate reporting data that can be used to change one or more operating environment parameters enabling a system to perform more targeted tests. For instance, reporting data identifying individual IRPs and processing parameters for individual IRPs can enable a testing procedure to be adjusted, e.g., different combination of IRPs can be run, or aspects of a computing device can be modified before additional iterations of a test are performed. In one illustrative example, a computer may operate with an enabled camera on a first iteration of a test and then operate with a disabled camera on a second iteration. In another example, a computer may operate with sleep mode enabled in a first iteration of a test and then operate with sleep mode disabled in a second iteration of the test. In some configurations, the techniques disclosed herein introduce machine learning algorithms that help automate testing procedures to mitigate or eliminate the need for labor-intensive, manual testing.

In one illustrative example, a system can include a stack having plurality of device objects and a plurality of filters in a serial configuration. The filters are positioned at predetermined locations with respect to the device objects to measure number processing parameters with respect to IRPs that are sent to the stack and processed by the device objects. In some configurations, a first filter is positioned to receive one or more IRPs. The first filter to measure number processing parameters such as a time in and a time out for each IRP. In addition, the first filter can determine when individual IRPs succeeded, failed, or pended. Such data can be used to determine which IRPs are concurrent. For illustrative purposes, two or more IRPs are concurrent when they have some overlap in a timeline from their time in and time out of the stack.

The first filter is configured to communicate individual IRPs to a first device object. The first device object may then communicate individual IRPs to a second device object, and other subsequent device objects. The second device object or other subsequent device objects may then communicate the IRPs to a second filter. The second filter can measure a number of processing parameters described herein. The second filter can then communicate the IRPs to one or more additional device objects, where the IRPs can then be rerouted back through the stack of device objects and filters.

For illustrative purposes, an Interrupt Request Packet (IRP) is also referred to herein as an I/O request packet, a request, or an interrupt request package. In some configurations, IRPs can be generated by applications, device objects, or devices. For instance, an IRP can include instructions to read, write, or otherwise process data. In other examples, an IRP can include instructions to control a hardware device. In one illustrative example, an IRP can include a hardware signal sent to a processor that temporarily stops a running program and allows a special program, an interrupt handler, to run instead. Hardware interrupts are used to handle events such as receiving data from a network card, key presses, or mouse movements. In one example, an IRP is a basic unit of work for a Devnode in the WINDOWS operating systems.

Referring now to FIG. 1, a computing system 100 (also referred to herein as a "system 100") implementing aspects of the present disclosure is shown. The computing system 100 can comprise a memory 101 containing a plurality of IRP sources 103 and a stack 104 having a plurality of device objects 107 and a plurality of filters 110. As can be applied to FIGS. 1 and 2, a device 108, which can be in the hardware layer 102, can be associated with one or more device objects, which are part of the device's Devnode. In some configurations, a device object can be associated with one device. In other words, a device can be associated with a Devnode which contains one or more device objects, and in some configurations, a Devnode and its device objects can only be associated with only one device. As described herein, the device objects 107 can be configured to control one or more aspects of a computing system 100, such as the hard drive, a graphics card, a network card, a keyboard, a mouse, etc. IRPs 120 can be generated and communicated from the IRP sources 103, which can be in the form of an application, a hardware device, testing equipment, or any other suitable computing resource for generating an IRP 120. The IRP source 103 may also be external to the memory 101 and/or the computing system 100.

As shown in FIG. 1, the computing system 100 comprises a first filter 110A configured to receive IRPs 120 from a number of IRP sources 103, which may be include software applications or, in some instances, device objects or hardware devices. The first filter 110A can receive the IRPs 120 and record one or more aspects of each IRP 120. For instance, the first filter 110A can record data indicating a time in and a time out for each IRP. In addition, the first filter 110A can record data identifying each IRP and data indicating a status of each IRP. As will be described in more detail below, the first filter 110A can record one or more status values with respect to individual IRPs 120.

From the first filter 110A, the IRPs 120 can be communicated to one or more device drivers. For instance, the IRPs 120 received by the first filter 110A can be communicated to the first device object 107A, where the IRPs 120 relevant to the first device object 107A are processed. The first device object 107A can further communicate one or more IRPs 120 to the second device object 107B, where the IRPs 120 relevant to the second device object 107B are processed.

From the second filter 110B, the computing system 100 can further communicate one or more IRPs 120 to the second filter 110B. The second filter 110B can receive the IRPs 120 and record one or more aspects of each IRP 120. For instance, the second filter 110B can record data indicating a time in and a time out for each IRP. In addition, the second filter 107B can record data identifying each IRP and data indicating a status of each IRP. The second filter 110B can record one or more status values with respect to individual IRPs 120.

Both the first device object 107A and the second device object 107B can record and communicate status values, e.g., data identifying a particular IRP 120 and other data indicating whether a particular IRP 120 has successfully completed, failed, pended, etc. Based on the data recorded by the filters 107, the computing system 100 can generate reporting data. In some configurations, the reporting data comprises an identification of individual interrupt request packets of the plurality of interrupt request packets. The reporting data can indicate a received "time-in" value for the individual interrupt request packetsand a "time-out" value for the individual interrupt request packets. The reporting data can also indicate one or more status values for the individual IRPs, e.g., whether an IRP succeeded, failed, or pended.

Figure 2:
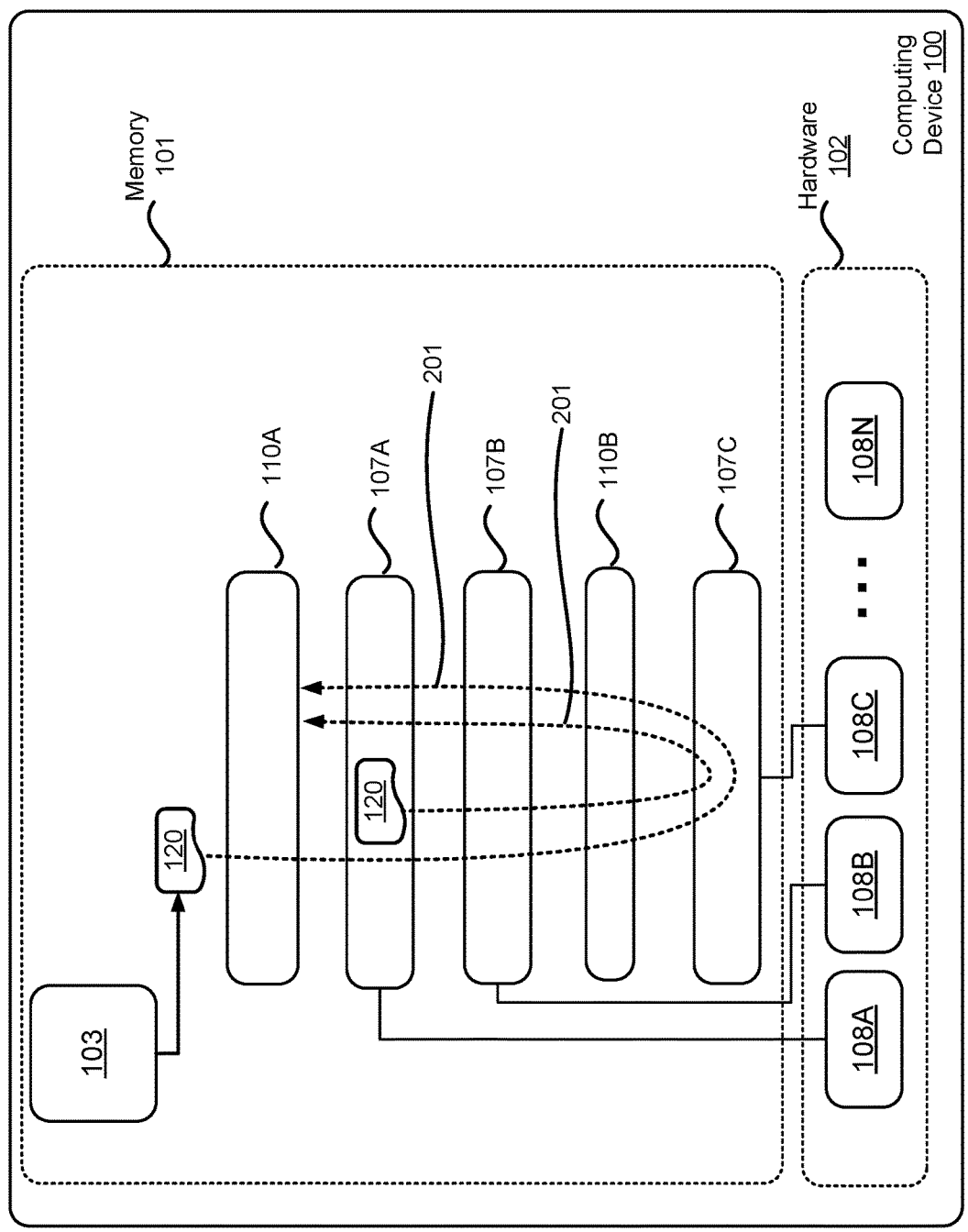
FIG. 2 is an example computing system illustrating a path that an interrupt request packet can follow through a stack of filters and device objects.

The first filter is configured to communicate individual IRPs to a first device object. The first device object may then communicate individual IRPs to a second device object, and other subsequent device objects. The second device object or other subsequent device objects may then communicate the IRPs to a second filter. The second filter can measure a number of processing parameters described herein. The second filter can then communicate the IRPs to one or more additional device objects, where the IRPs can then be rerouted back through the stack of device objects and filters. FIG. 2 illustrates example paths 201 an IRP 120 can take through the stack 104. It can be appreciated that each filter 110 and device object 107 can communicate individual IRPs through the stack as illustrated by the arrow shown in FIG. 2. An IRP 120 can originate from a source 103, a device object 107, or any other resource suitable for generating an IRP 120. As will be described in more detail below, the filters 110 can be configured to record the activity of each IRP 120 passing through each filter 110 and each filter 110 can generate data indicating a status of individual IRPs as well as stack locations associated with each status.

In some configurations, a status value associated with individual IRPs can also be associated with a location. In one illustrative example, reporting data can associate a stack location with an individual IRP and a status value. For illustrative purposes, with reference to FIG. 2, the filters 110 and the device objects 107 can be individually identified as a stack location. For example, the first filter 110A can be a first stack location ("stack location 1"), the first device object 107B can be a second stack location ("stack location 2"), the second device object 107B can be a third stack location ("stack location 3"), second filter 110B can be a fourth stack location ("stack location 4"), and the third device object 107C can be a fifth stack location ("stack location 5"). As will be described in more detail below, data generated by the techniques disclosed herein can indicate a location in the stack 104 that is associated with a particular status.

The example shown in FIG. 2 is provided for illustrative purposes and is not to be construed as limiting. The filters 110 can be in any predetermined location relative to the device objects 107. The configuration shown in FIG. 2 illustrates an embodiment where a filter 110A is positioned between the IRP sources 103 and the first device object 107A. Other filters 110 can be positioned between the other device objects 107.

Figure 3:
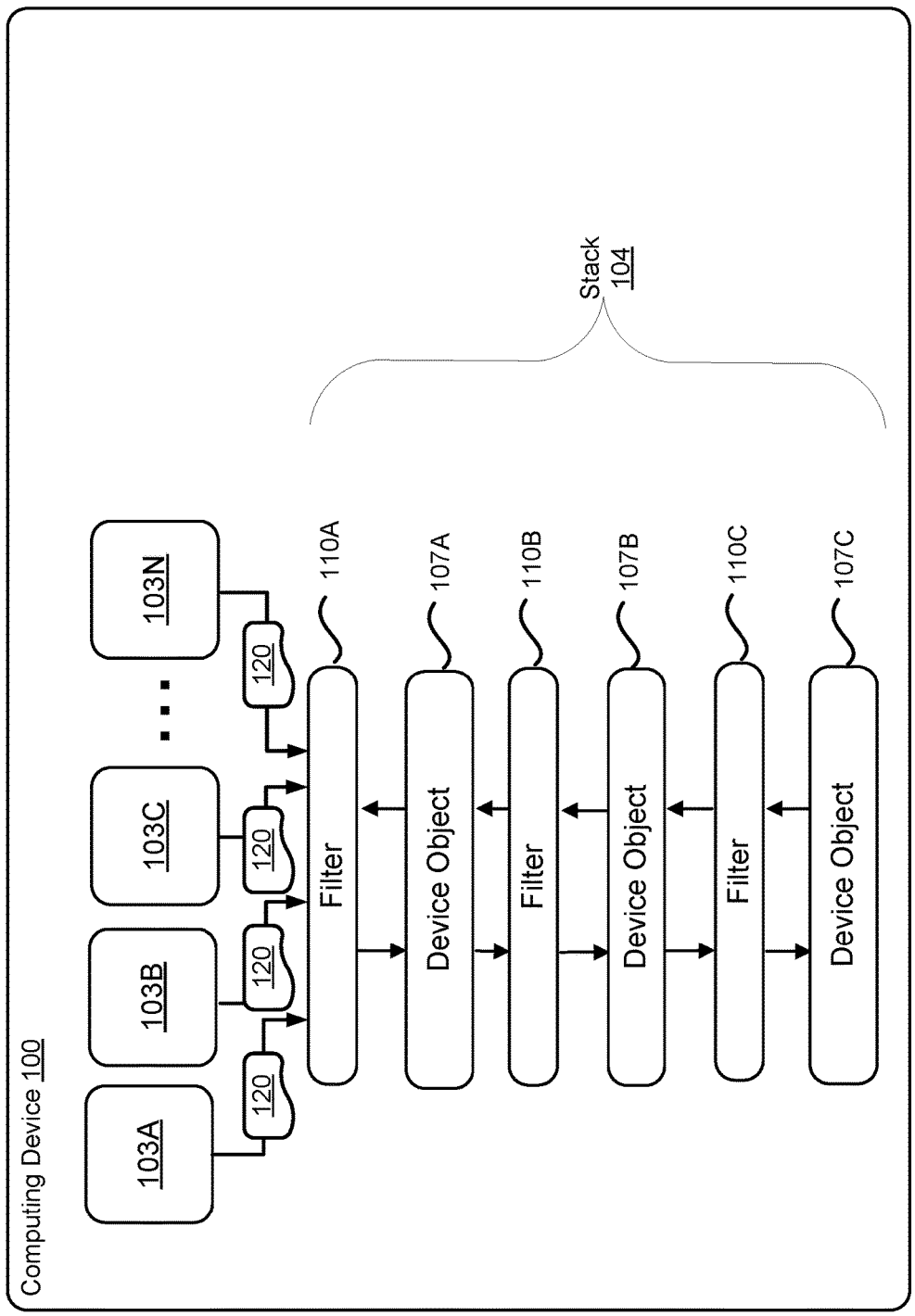
FIG. 3 is an example computing system having an alternative configuration of a stack.

FIG. 3 illustrates another example of the computing device 100 having a different configuration. In this example, the stack 104 includes a first filter 110A positioned between the IRP sources 103 and the first device object 107A. This particular example also includes filters 110 between each device object 107. Specifically, a second filter 110B and a third filter 110C are positioned between device objects 107B and 107C, providing an alternating configuration. Different configurations having filters 110 positioned between any pair of device objects 107 can be utilized. A filter 110 can be utilized to record processing parameters for IRPs at any suitable stack location.

The reporting data generated by the techniques disclosed herein can be in a number of different formats and can include different types of information. In one illustrative example, the reporting data can identify one or more IRPs that have been sent to, or generated by, the stack 104. An IRP identifier can be in the form of a name, a number or any other code identifying a particular IRP or class of IRPs. The reporting data can also include one or more processing parameters. TABLE 1 below illustrates one illustrative example of an output of reporting data that can be generated by the techniques disclosed herein.

TABLE 1

| MJ IRPs Covered | Number of Times Hit |
|---|---|
| IRP_MJ_UNKNOWN | 5 |
| IRP_MJ_PNP | 14 |
| IRP_MJ_DEVICE_CONTROL | 293 |
| IRP_MJ_READ | 2543 |
| IRP_MJ_CREATE | 44 |
| IRP_MJ_CLEANUP | 45 |
| IRP_MJ_CLOSE | 43 |
| IRP_MJ_WRITE | 2488 |
| IRP_MJ_SYSTEM_CONTROL | 6 |
| IRP_MJ_FLUSH_BUFFERS | 1491 |
| IRP_MJ_POWER | 2 |
| IRP_MJ_SHUTDOWN | 2 |

The left column of TABLE 1 identifies individual IRPs that are covered. The right column of TABLE 1 shows the number of hits for each IRP. The techniques disclosed herein can also utilize such data to build charts, including pie charts, line charts, and the other suitable graphical reports.

As summarized herein, the techniques disclosed herein can also be utilized to measure processing of concurrently pending IPRs. By collecting data at predetermined stack locations, such as the locations of the filters 110 shown in FIG. 1, reporting data including concurrent IRPs can also be generated. TABLE 2 illustrates one example of such a report.

TABLE 2

| IRP Pairs covered Concurrently | Number of Times |
|---|---|
| IRP_MJ_CREATE, IRP_MJ_READ | 10 |
| IRP_MJ_CREATE, IRP_MJ_WRITE | 5 |
| IRP_MJ_CREATE, IRP_MJ_DEVICE_CONTROL | 4 |
| IRP_MJ_CLOSE, IRP_MJ_READ | 10 |
| IRP_MJ_CLOSE, IRP_MJ_WRITE | 4 |
| IRP_MJ_CLOSE, IRP_MJ_DEVICE_CONTROL | 4 |
| IRP_MJ_READ, IRP_MJ_READ | 1513 |
| IRP_MJ_READ, IRP_MJ_WRITE | 1498 |
| IRP_MJ_READ, IRP_MJ_FLUSH_BUFFERS | 929 |

The left column of TABLE 2 identifies the concurrent IRP pairs. The right column of TABLE 2 shows the number of hits for each concurrent IRP pair. As described above, concurrency can be measured by the timestamps of each IRP detected at the filters 110, and such timestamps can be used to determine whether a particular IRP is in-flight with another IRP. In some configurations, the system 100 can determine when two or more interrupt request packets are concurrent, wherein two or more request packets are concurrent when the two or more request packets have an overlapping time-in-flight. An IRP is in-flight, e.g., has time-in-flight, after an "in-time" up to the "out-time." An in-time, for instance, can be at a time when an IRP is received by a filter, such as the first filter 110A. An out-time, for example, can be a point in time when an IRP has failed, successfully completed, etc.

Figure 4A:
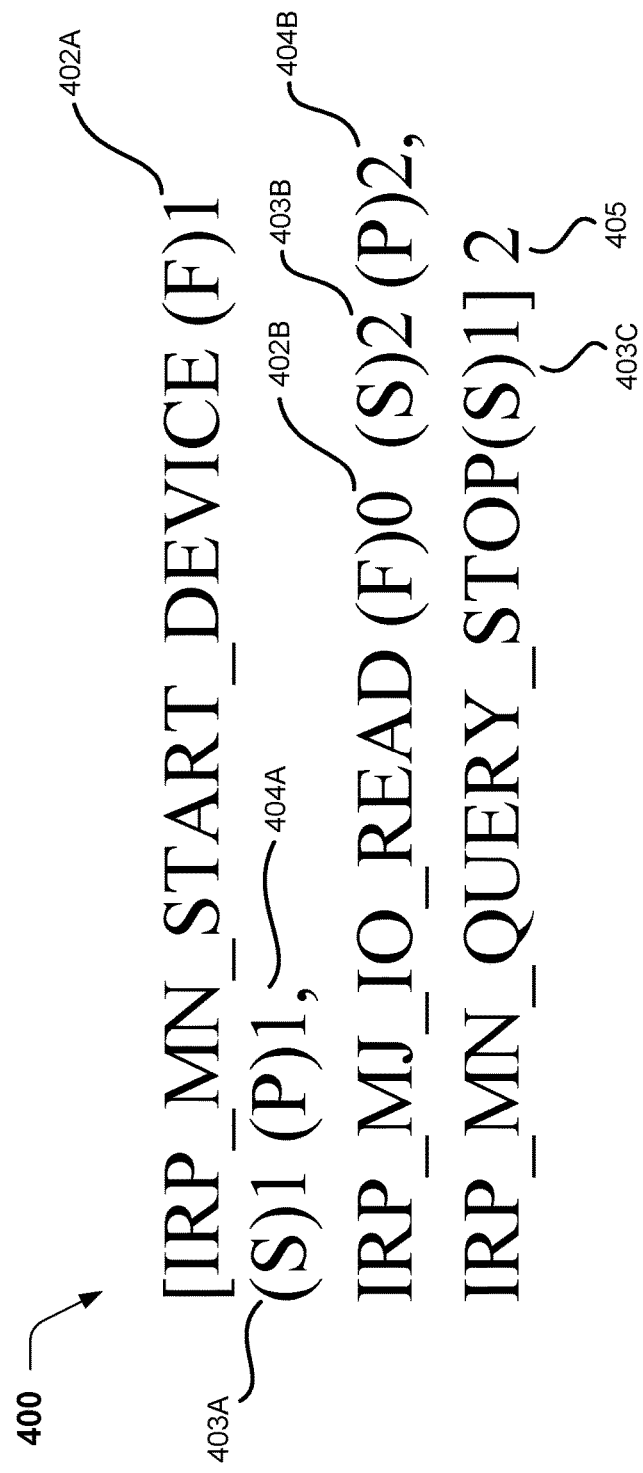
FIG. 4A illustrates one embodiment of reporting data that can be generated by the techniques disclosed herein.

FIG. 4A illustrates one example of reporting data 400 that can be generated by the system 100. In this illustrative example, there are three types of IRPs having status values, which can be used as a measure of concurrency. In this example, a first status value 402 can indicate a number of packets that have failed, a second status value 403 can indicate a number of request packets that have succeeded, and a third status value 404 indicating a number of request packets that are pended.

In this illustrative example, there are three types of IRPs: a Start Device IRP, a Read IRP and a Query Stop IRP. In the illustrative example of FIG. 4A, there are three Start Device IRPs: one failed, one succeeded, and one pended. The first status value 402A, the second status value 403A, and the third status value 404A indicate that the Start Device IRP was processed three times in the IRP Concurrency Window of the devnode and failed once, succeeded once, and pended one time.

In the example of FIG. 4A, there are five read requests: zero failed, two succeeded, and two are pended. The first status value 402B, the second status value 403B, and the third status value 404B indicate that the Read IRP was processed four times in the IRP Concurrency Window of the devnode: succeeded twice and pended two times.

In addition, there is only one Query Stop request. As indicated by the reporting data 400, the Stop Device IRP was processed 1 time in the IRP Concurrency Window of the devnode and succeeded one time.

Also shown in FIG. 4A, the reporting data 400 can also include a fourth status value 405 indicating the number of times a sequence of IRPs, also referred to herein as a concurrency window, are executed. The outer brackets indicate that the sequence of IRPs within the brackets occurred two times. In the illustration of FIG. 4A, the IRP sequence within the brackets defines the IRP Concurrency Window, and the fourth status value 405 indicates the number of iterations the sequence of IRPs is executed.

FIG. 4B illustrates another example of reporting data 400 that can be generated by the system 100. In this illustrative example, data indicating a stack location that is associated with the status values is included. For illustrative purposes, the data indicating a stack location is also referred to herein as the "Devnode penetration coverage data 420" or the "coverage data 420."

In this example, for the Start Device IRP, coverage data 420A is associated with the first status value 402A indicating a number of packets that have failed, coverage data 420B is associated with the second status value 403A indicating a number of request packets that have succeeded, and coverage data 420C is associated with status value 404A indicating a number of request packets that are pended.

For the Read IRP, coverage data 420D is associated with the first status value 402B indicating a number of packets that have failed, and coverage data 420E is associated with the second status value 403B indicating a number of request packets that have succeeded. For the Query Stop IRP, coverage data 420F is associated with the second status value 403C indicating a number of request packets that have succeeded. The reporting data 400 can also include a fourth status value 405 indicating the number of times a sequence of IRPs has been executed.

The example data shown in FIG. 4B shows that the Start Device IRP was processed four times in the devnode, and failed once at stack location 2, and the devnode had 5 stack locations. The Start Device IRP succeeded once at stack location 2, and pended once at stack location 2. The Read IRP was processed 4 times in the ICW of the devnode and succeeded twice at stack location 4 and pended 2 times at stack location 4. The Stop Device IRP was processed one time in the ICW of the devnode and succeeded once at stack location five. The fourth status value 405 indicates that this sequence of IRP (the IRPs within the brackets) occurred two times.

As summarized above, the techniques disclosed herein can also cause a computing device or a computing system to change one or more operating environments based on the reporting data 400. For instance, reporting data 400 identifying individual IRPs and processing parameters for individual IRPs can enable a testing procedure to be adjusted, e.g., different combinations of IRPs can be run in a subsequent test, or aspects of a computing device can be modified before additional iterations of a test are performed.

In one illustrative example, a computer may operate with an enabled camera on a first iteration of a test and then operate with a disabled camera on a second iteration. In another example, a computer may operate with sleep mode enabled in a first iteration of a test and then operate with sleep mode disabled in a second iteration of the test.

In some configurations, the techniques disclosed herein introduce machine learning algorithms that help automate and further target testing procedures to mitigate or eliminate the need for labor-intensive, manual testing. The term "machine learning" may refer to one or more programs that learns from the data it generates and/or receives. For example, a machine learning mechanism may build, modify or otherwise utilize a model that is created from example inputs and makes predictions or decisions using the model. The machine learning mechanism may be used to improve the identification of one or more changes to a computing environment for testing purposes. The model may be trained using supervised and/or unsupervised learning. For instance, over time, as the machine learning mechanism receives more data, a particular list of IRPs to send to a computer or one or more computer settings (e.g., an enabled or disabled operating system setting,) may change as a result of test iterations based on reporting data 400 generated and received by a computer or machine testing one or more computers.

Different machine learning mechanisms may be utilized. For example, a classification mechanism may be utilized to determine a particular list of IRPs to send to a computer or one or more computer settings. The classification mechanism may classify the particular list of IRPs or one or more computer settings into different categories that provide an indication of whether the particular list of IRPs or one or more computer settings will be utilized by a particular test iteration. For example, the display elements may be classified into a first category (e.g., an IRP not likely to be utilized) and a second category (e.g., an IRP likely to be utilized). In some configurations, more classification categories may be utilized. In other examples, a statistical mechanism may be utilized to determine the particular list of IRPs or one or more computer settings. For example, a linear regression mechanism may be used to generate a score that indicates a likelihood that the particular list of IRPs or one or more computer settings will be selected for executing a test iteration. Linear regression may refer to a process for modeling the relationship between one variable and one or more other variables. Different linear regression models might be used to calculate the score. For example, a least squares approach might be utilized, a maximum-likelihood estimation might be utilized, or another approach might be utilized.

Figure 5:
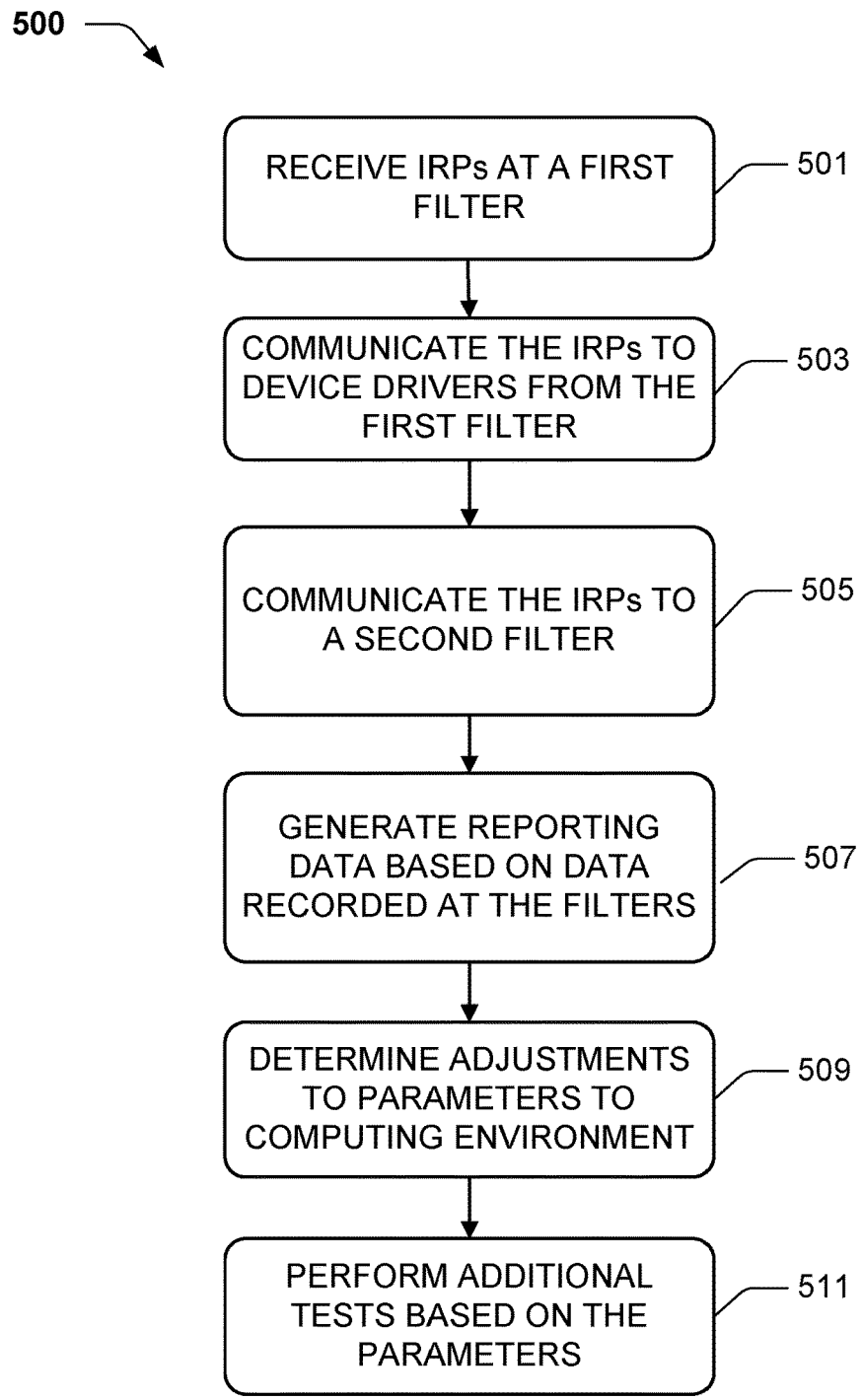
FIG. 5 is a flow diagram showing a routine for enabling the techniques and technologies presented herein.

Turning now to FIG. 5, aspects of an example routine 500 for providing enhanced techniques for detecting programming errors in device drivers are shown and described below. It should be understood that the operations of the methods disclosed herein are not necessarily presented in any particular order and that processing of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the processing and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by system components, which can comprise an application, component and/or a circuit. In some configurations, the system components include a dynamically linked library (DLL), a statically linked library, functionality produced by an application programing interface (API), a compiled program, an interpreted program, a script or any other executable set of instructions. Data, such as the reporting data 400, can be stored in a data structure in one or more memory components. Data can be retrieved from the data structure by addressing links or references to the data structure.

Although the following illustration refers to the computer components shown in the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. Any service, circuit or application suitable for providing the techniques disclosed herein can be used in operations described herein.

With reference to FIG. 5, the routine 500 begins at operation 501, where a first filter receives IRPs from one or more sources. As summarized above, the first filter is configured to receive one or more IRPs, and the first filter can record or generate reporting data 400. The first filter can measure number processing parameters such as a time in and a time out for each IRP. The first filter can record other information such as an identifier for each IRP and one more status values with respect to each IRP. For example, the first filter can determine when individual IRPs succeeded, failed, or pended. Such data can be used to determine which IRPs are concurrent. The first filter, or any other filter described herein, can determine a status value of an individual IRP by receiving data from device objects. In some configurations, a device object may provide data indicating that a particular IRP has succeeded, failed, or pended.

Next, at operation 503, the first filter can communicate, (e.g., relay the IRPs) to one or more device objects, also referred to herein as "device drivers." As each device object receives the IRPs, IRPs can be processed to perform a function defined by the IRP. For instance, an IRP can cause a device to perform a read or write function and can cause a device to turn on or shut down, etc.

Next, at operation 505, the device objects can communicate one or more IRPs to a second filter. It can be appreciated that operation 505 is optional given that a system 100 may only have one filter. It can also be appreciated that a system 100 may comprise any suitable number of filters, and the filters can be positioned at any stack location relative to one or more device objects. Similar to the first filter, the second filter can measure number processing parameters such as a time in and a time out for each IRP. The second filter can record other information such as an identifier for each IRP and one or more status values with respect to each IRP. For example, the second filter can determine when individual IRPs succeeded, failed, or pended.

Next, at operation 507, the filters can generate reporting data 400, which can be communicated to any component or storage device. The reporting data 400 can comprise an identification of IRPs. The reporting data can indicate a received time-in value for the IRPs, a time-out value for the IRPs, and one or more status values for the IRPs.

Next, at operation 509, the system 100 can determine what adjustments to a computing environment or testing procedures are needed based on the reporting data 400. As summarized herein, adjustments can be made to any suitable computing environment, which may include particular settings for sleep mode, a clock speed, a status of an application, and/or a status of a device such as a camera, etc. In some configurations, the determination can be made based on machine learning technologies.

Next, at operation 511, the system 100 can cause additional test procedures to be executed based on the adjustments determined at operation 509. It can be appreciated that testing procedures may involve a number of iterations and a number of adjustments for individual IRPs in batches of concurrent IRPs which are run through a system 100.

Figure 6:
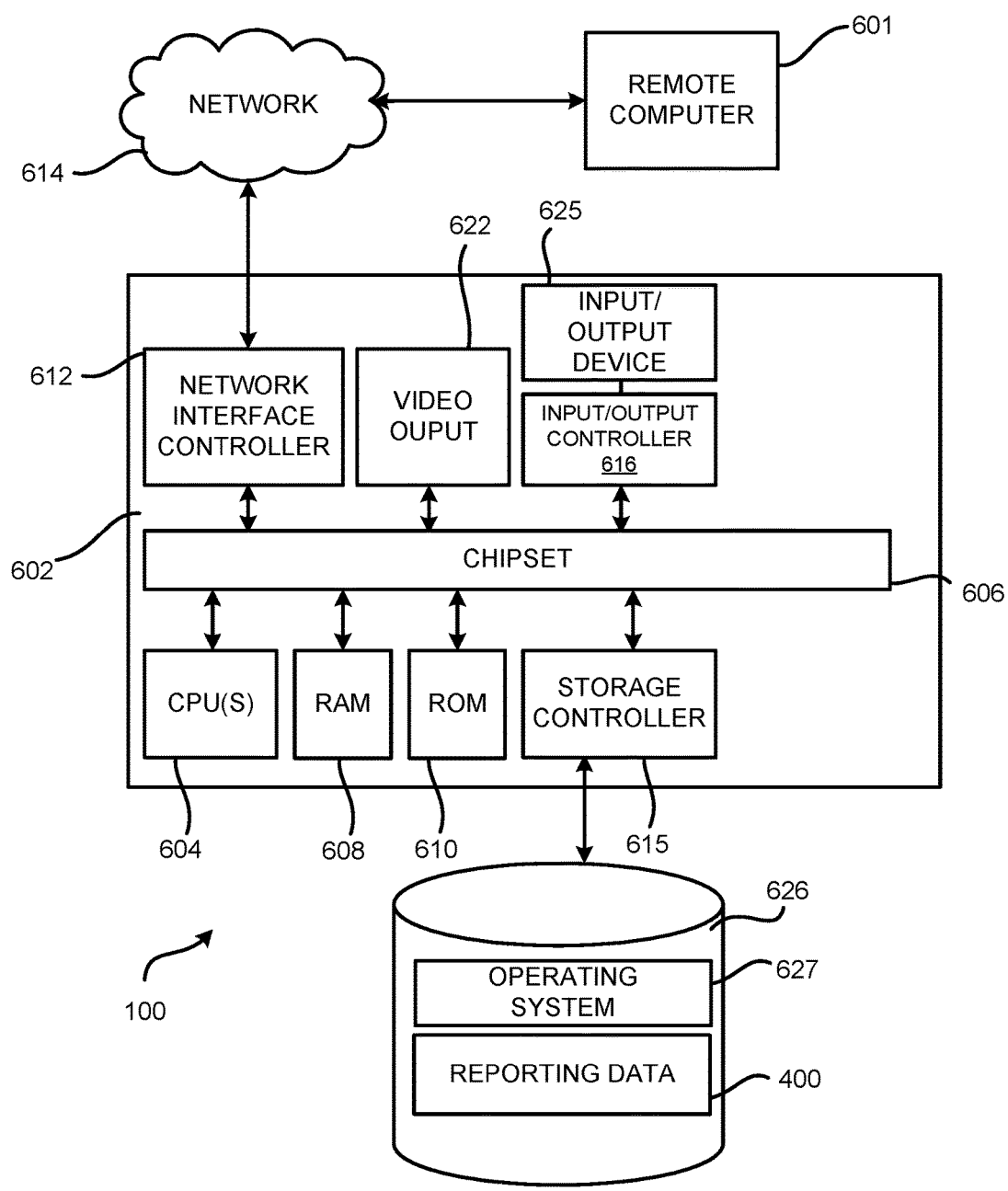
FIG. 6 is a computer architecture diagram illustrating a computing device architecture for a computing device capable of implementing aspects of the techniques and technologies presented herein.

FIG. 6 shows additional details of an example computer architecture for the components of the system 100 of FIG. 1 capable of executing the techniques described above. The computer architecture shown in FIG. 6 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above.

The system 100 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the system 100.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the system 100. The chipset 606 may further provide an interface to a computer-readable storage medium such as a read-only memory ("ROM") 610 or non-volatile RAM ("NVRAM") for storing basic routines that help to startup the system 100 and to transfer information between the various components and devices. The ROM 610 or NVRAM may also store other software components necessary for the operation of the system 100 in accordance with the embodiments described herein. Any of the components of FIG. 6 can function as the memory 101 of FIG. 1.

The system 100 may operate in a networked environment using logical connections to remote computing devices and computer systems through a network 614, such as the local area network. The chipset 606 may include functionality for providing network connectivity through a network interface controller (MC) 612, such as a gigabit Ethernet adapter. The NIC 612 is capable of connecting the system 100 to other computing devices over the network. It should be appreciated that multiple NICs 612 may be present in the system 100, connecting the computer to other types of networks and remote computer systems. The network allows the system 100 to communicate with remote services and servers, such as the remote computer 601. As can be appreciated, the remote computer 601 may host a number of services such as a test service. In addition, as described above, the remote computer 601 may mirror and reflect data stored on the system 100 and host services that may provide data or processing for the techniques described herein.

The system 100 may be connected to a mass storage device 626 that provides non-volatile storage for the computing device. The mass storage device 626 may store system programs, application programs, other program modules, and data, which have been described in greater detail herein. The mass storage device 626 may be connected to the system 100 through a storage controller 615 connected to the chipset 606. The mass storage device 626 may consist of one or more physical storage units. The storage controller 615 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 626, other storage media and the storage controller 615 may include MultiMediaCard (MMC) components, eMMC components, Secure Digital (SD) components, PCI Express components, or the like.

The system 100 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the system 100 may store information to the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The system 100 may further read information from the mass storage device 626 by detecting the physical states or characteristics of one or more particular locations within the physical storage units.

In addition to the mass storage device 626 described above, the system 100 may have access to other computer-readable media to store and retrieve information, such as program modules, data structures, or other data. Thus, an application, other data and other modules are depicted as data and software stored in the mass storage device 626; it should be appreciated that these components and/or other modules may be stored, at least in part, in other computer-readable storage media of the system 100. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the system 100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), BLU-RAY, or other optical storage, magnetic cassettes, magnetic tape, magnetic disk storage or other magnetic storage devices, or any other medium that can be used to store the desired information and which can be accessed by the system 100. For purposes of the claims, the phrase "computer storage medium," "computer-readable storage medium," and variations thereof, does not include waves or signals per se and/or communication media.

The mass storage device 626 may store an operating system 627 utilized to control the operation of the system 100. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 626 may store other system or application programs and data utilized by the system 100, such as any of the other software components and data described above. The mass storage device 626 might also store other programs and data not specifically identified herein.

In one embodiment, the mass storage device 626 or other computer-readable storage media is encoded with computer-executable instructions which, when loaded into the system 100, transform the computer from a general-purpose computing system into a special-purpose computer capable of implementing the embodiments described herein. These computer-executable instructions transform the system 100 by specifying how the CPUs 604 transition between states, as described above. According to one embodiment, the system 100 has access to computer-readable storage media storing computer-executable instructions which, when executed by the system 100, perform the various routines described above with regard to FIG. 7 and the other FIGURES. The system 100 might also include computer-readable storage media for performing any of the other computer-implemented operations described herein.

The system 100 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controller 616 is in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone, a speaker, game controllers and/or audio devices.

For example, the input/output controller 616 can be an encoder and the output device 625 can include a full speaker system having a plurality of speakers. The encoder can use any suitable technology for encoding and generating data to produce audio output data or output signals received from an application. The encoder can utilize a selected suitable technology to generate a spatially encoded stream that appropriately renders to the output device 625.

In addition, or alternatively, a video output 622 may be in communication with the chipset 606 and operate independently of the input/output controllers 616. It will be appreciated that the system 100 may not include all of the components shown in FIG. 6, may include other components that are not explicitly shown in FIG. 6, or may utilize an architecture completely different than that shown in FIG. 6.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for measuring processing of a plurality of interrupt request packets communicated to a stack comprising a plurality of device objects and a plurality of filters, the computer-implemented method comprising:
   receiving the plurality of interrupt request packets at a first filter of the plurality of filters;
   communicating the plurality of interrupt request packets to one or more device objects of the plurality of device objects from the first filter for processing of the plurality of interrupt request packets at the one or more device objects;
   communicating the plurality of interrupt request packets to a second filter of the plurality of filters from the one or more device objects; and
   generating reporting data at the first filter and the second filter, the reporting data comprising an identification of individual interrupt request packets of the plurality of interrupt request packets, the reporting data indicating a received time-in value for the individual interrupt request packets, a time-out value for the individual interrupt request packets; and one or more status values for the individual interrupt request packets.

2. The computer-implemented method of claim 1, further comprising:
   determining one or more adjustments to a computing environment based on the reporting data;
   modifying the computing environment based on the one or more adjustments; and
   causing one or more interrupt request packets to be sent to the stack for measuring processing of the one or more interrupt request packets.

3. The computer-implemented method of claim 1, wherein the one or more status values indicates when the individual interrupt request packets have succeeded, failed, or pended.

4. The computer-implemented method of claim 1, further comprising determining when two or more interrupt request packets of the plurality of interrupt request packets are concurrent, wherein two or more request packets are concurrent when the two or more request packets have an overlapping time-in-flight.

5. The computer-implemented method of claim 1, wherein the plurality of device objects and the plurality of filters are arranged in a serial configuration, the first filter positioned to receive interrupt request packets before a first device object of the plurality of device objects.

6. The computer-implemented method of claim 1, wherein the second filter is at a stack location positioned before the last device object in the serial configuration.

7. The computer-implemented method of claim 2, further comprising configuring the one or more interrupt request packets based on the reporting data.

8. The computer-implemented method of claim 2, wherein the determining one or more adjustments to a computing environment comprises a machine learning process for storing and analyzing the reporting data for improving test iterations.

9. A system, comprising:
   a processor;
   a memory having a stack data structure, the stack data structure comprising a plurality of device objects and a plurality of filters, the memory having computer-executable instructions stored thereupon which, when executed by the processor, cause the system to
   receive the plurality of interrupt request packets at a first filter of the plurality of filters;
   communicate the plurality of interrupt request packets to one or more device objects of the plurality of device objects from the first filter for processing of the plurality of interrupt request packets at the one or more device objects;
   communicate the plurality of interrupt request packets to a second filter of the plurality of filters from the one or more device objects; and
   generate reporting data at the first filter and the second filter, the reporting data comprising an identification of individual interrupt request packets of the plurality of interrupt request packets, the reporting data indicating a received time-in value for the individual interrupt request packets, a time-out value for the individual interrupt request packets; and one or more status values for the individual interrupt request packets.

10. The system of claim 9, wherein the instructions further cause the system to:
    determine one or more adjustments to a computing environment based on the reporting data;
    modify the computing environment based on the one or more adjustments; and
    cause one or more interrupt request packets to be sent to the stack for measuring processing of the one or more interrupt request packets.

11. The system of claim 9, wherein the one or more status values indicates when the individual interrupt request packets have succeeded, failed, or pended.

12. The system of claim 9, wherein the instructions further cause the system to determine when two or more interrupt request packets of the plurality of interrupt request packets are concurrent, wherein two or more request packets are concurrent when the two or more request packets have an overlapping time-in-flight.

13. The system of claim 9, wherein the plurality of device objects and the plurality of filters are arranged in a serial configuration, the first filter positioned to receive interrupt request packets before a first device object of the plurality of device objects.

14. The system of claim 9, wherein the second filter is at a stack location positioned before the last device object in the serial configuration.

15. The system of claim 10, wherein the instructions further cause the system to configure the one or more interrupt request packets based on the reporting data.

16. The system of claim 10, wherein determining one or more adjustments to a computing environment comprises a machine learning process for storing and analyzing the reporting data for improving future test iterations.

17. A computer-readable storage medium storing a stack data structure, the stack data structure comprising a plurality of device objects and a plurality of filters, wherein the computer-readable storage medium further comprises computer-executable instructions stored thereupon which, when executed by one or more processors of a system, cause the one or more processors of the system to:
   receive the plurality of interrupt request packets at a first filter of the plurality of filters;
   communicate the plurality of interrupt request packets to one or more device objects of the plurality of device objects from the first filter for processing of the plurality of interrupt request packets at the one or more device objects;

communicate the plurality of interrupt request packets to a second filter of the plurality of filters from the one or more device objects; and generate reporting data at the first filter and the second filter, the reporting data comprising an identification of individual interrupt request packets of the plurality of interrupt request packets, the reporting data indicating a received time-in value for the individual interrupt request packets, a time-out value for the individual interrupt request packets; and one or more status values for the individual interrupt request packets.

18. The computer-readable storage medium of claim 17, wherein the instructions further cause the system to:

determine one or more adjustments to a computing environment based on the reporting data;

modify the computing environment based on the one or more adjustments; and cause one or more interrupt request packets to be sent to the stack for measuring processing of the one or more interrupt request packets.

19. The computer-readable storage medium of claim 18, wherein the instructions further cause the system to configure the one or more interrupt request packets based on the reporting data.

20. The computer-readable storage medium of claim 18, wherein determining one or more adjustments to a computing environment comprises a machine learning process for storing and analyzing the reporting data for improving future test iterations.

* * * * *